(12) United States Patent
Hölzel (10) Patent No.: US 9,981,536 B2
(45) Date of Patent: May 29, 2018

(54) ASSEMBLY HAVING A COVER FOR A VEHICLE ROOF

(71) Applicant: Webasto SE, Stockdorf (DE)

(72) Inventor: Dominik Hölzel, Olching (DE)

(73) Assignee: WEBASTO SE, Stockdorf (DE)

(*) Notice: Subject to any disclaimer, the term of this patent is extended or adjusted under 35 U.S.C. 154(b) by 0 days. days.

(21) Appl. No.: 15/309,788

(22) PCT Filed: Apr. 21, 2015

(86) PCT No.: PCT/EP2015/058576
§ 371 (c)(1),
(2) Date: Nov. 8, 2016

(87) PCT Pub. No.: WO2015/172979
PCT Pub. Date: Nov. 19, 2015

(65) Prior Publication Data
US 2017/0174061 A1  Jun. 22, 2017

(30) Foreign Application Priority Data

May 14, 2014 (DE) .......... 10 2014 106 812
Aug. 13, 2014 (DE) .......... 10 2014 111 539

(51) Int. Cl.
*B60J 7/057* (2006.01)
*B60J 7/043* (2006.01)
*B60J 7/02* (2006.01)

(52) U.S. Cl.
CPC .......... *B60J 7/0435* (2013.01); *B60J 7/022* (2013.01); *B60J 7/057* (2013.01)

(58) Field of Classification Search
CPC ... B60J 7/0435; B60J 7/05; B60J 7/057; B60J 7/047

(Continued)

(56) References Cited

U.S. PATENT DOCUMENTS 5,879,049 A    3/1999   Sinelli
7,490,894 B2 * 2/2009   Oechel .......... B60J 7/05
                                        296/216.02

(Continued)

FOREIGN PATENT DOCUMENTS

DE    102005059288 A1   6/2007
DE    102008024948 A1   12/2009

(Continued)

OTHER PUBLICATIONS

International Search Report for PCT/EP2015/058576 dated Jun. 26, 2015; English translation submitted herewith (7 pages).

(Continued)

*Primary Examiner* — Dennis H Pedder
(74) *Attorney, Agent, or Firm* — Fitch, Even, Tabin & Flannery LLP (57) ABSTRACT

An arrangement having a cover for a vehicle roof which, starting from a closed position for closing a roof opening, can be raised in the rear region thereof for opening using deployment means and which can be displaced toward the rear over the vehicle roof into an open position. The deployment means have a sliding member which can be displaced in a guide rail along the longitudinal direction of the vehicle by means of a drive and which has a first coupling element and a second coupling element. The deployment means further have a cover carrier which is mechanically coupled to the cover and which cover carrier has with respect to the longitudinal vehicle direction a front slotted link and a rear slotted link which is arranged behind the front slotted link.

10 Claims, 3 Drawing Sheets

(58) Field of Classification Search
USPC .................. 296/216.02–216.05, 221–223
See application file for complete search history.

(56) References Cited

U.S. PATENT DOCUMENTS

| | | | | |
|---|---|---|---|---|
| 8,720,987 | B2 * | 5/2014 | Ohdoi | ............... B60J 7/024 296/216.03 |
| 2005/0023868 | A1 | 2/2005 | Ettl et al. | |

FOREIGN PATENT DOCUMENTS

| | | |
|---|---|---|
| DE | 202010012974 U1 | 2/2012 |
| DE | 102012025071 A1 | 7/2013 |
| EP | 1493601 A2 | 1/2005 |
| EP | 2650156 A1 | 10/2013 |
| EP | 2727755 A1 | 5/2014 |
| JP | 2012121359 A | 6/2012 |
| JP | 2013226963 A | 11/2013 |
| WO | 2007076782 A1 | 7/2007 |
| WO | 2008/017294 A1 | 2/2008 |

OTHER PUBLICATIONS

Examination Report issued against corresponding Japanese Application No. JP2016-567034 dated Oct. 24, 2017.

* cited by examiner

ASSEMBLY HAVING A COVER FOR A VEHICLE ROOF

CROSS-REFERENCE TO RELATED APPLICATIONS

This application is a U.S. national phase application filed under 35 U.S.C. § 371 of International Application No. PCT/EP2015/058576, filed Apr. 21, 2015, designating the United States, which claims priority from German Patent Application Nos. 10 2014 106 812.2 and 10 2014 111 539.2 filed May 14, 2014 and Aug. 13, 2014, respectively, which are hereby incorporated herein by reference in their entirety for all purposes.

FIELD

The invention relates to an arrangement having a cover for a vehicle roof which, starting from a closed position for closing a roof opening, can be raised for opening using deployment means in the rear region thereof and which can be displaced toward the rear into an open position.

BACKGROUND

Such arrangements having a cover for a vehicle roof are known in many forms from the prior art. Typically, during the opening operation, a sliding drive member is displaced toward the rear in the longitudinal direction of the vehicle. In lateral regions of the cover, deployment means are provided in order to raise the cover into a ventilator position before it is displaced further toward the rear into an open position in order to release the roof opening.

An object forming the basis of the invention is to describe an arrangement having a cover for a vehicle roof which is distinguished by a small requirement in terms of structural space.

SUMMARY

According to the invention there is described an arrangement having a cover for a vehicle roof which, starting from a closed position for closing a roof opening, can be raised in the rear region thereof for opening using deployment means and which cover can be displaced toward the rear over the vehicle roof into an open position. The deployment means have a sliding member which can be displaced in a guide rail in the longitudinal direction of the vehicle by means of a drive and which sliding member has a first coupling element and a second coupling element. The deployment means further have a cover carrier which is mechanically coupled to the cover and which has with respect to the longitudinal vehicle direction a front slotted link and a rear slotted link which is arranged behind the front slotted link. In the closed position of the cover, the second coupling element is in engagement with the rear slotted link. The deployment means are constructed in such a manner that, starting from the closed position of the cover when the sliding member is displaced toward the rear in the longitudinal direction of the vehicle by means of the rear slotted link, a movement of the sliding member relative to the cover is first released and a deployment of the cover in a vertical direction can be controlled. In the event of further displacement, the first coupling element is coupled into the front slotted link and by means of the front slotted link a carrying of the cover carrier by the sliding member relative to the guide rail can be controlled.

The displacement of the cover over the vehicle roof means that the cover after lifting or deployment in the region of a rear edge of the cover is pushed over an outer side of the vehicle roof. Preferably, the arrangement is an arrangement for a spoiler roof.

The location indications or directional indications used, such as "rear" or "front", refer to the longitudinal direction of the vehicle. The longitudinal direction of the vehicle may also be referred to as the horizontal direction or X direction. The deployment or lifting of the cover is carried out substantially in a vertical direction or Z direction. The rear region of the cover is intended, for example, to be understood to be the region which, starting from a center of the cover, faces the rear of the vehicle.

The arrangement makes provision for the sliding carriage to have two coupling elements with which a slotted link which is stationary fixed with respect to the cover carrier is associated in each case. In this instance, in the longitudinal vehicle direction, the rear slotted link of the cover carrier is arranged behind the front slotted link. In a similar manner, the second coupling element in the longitudinal vehicle direction is arranged behind the first coupling element.

As already mentioned, in the closed position of the cover, the second coupling element is in engagement with the rear slotted link. Starting from the closed position of the cover, when the sliding member is displaced by means of the rear slotted link, a movement of the sliding member relative to the cover or the cover carrier is initially released and a deployment of the cover in the vertical direction can be controlled. In particular, a lifting of the cover in the front region can be controlled. When the sliding member is further displaced, the first coupling element can be coupled into the front slotted link, wherein the front slotted link controls a carrying of the cover carrier by the sliding member relative to the guide rail. In this instance, the front slotted link is constructed in such a manner that, after the coupling of the first coupling element into the front slotted link, the slotted link locks a relative movement in the X direction between the cover carrier and the sliding member. In particular, the slotted link by means of the first coupling element guides the cover carrier in the X direction as soon as the cover carrier and the sliding member do not carry out any or carry out almost no relative movement in the X direction. In this instance, only a relative movement between the cover carrier and the sliding member in the vertical direction is released. That is to say, in order to deploy and carry the cover carrier, a transfer from the second coupling element to the first coupling element takes place.

In this instance, it is optionally possible for both coupling elements during the displacement of the sliding member to simultaneously control the carrying of the cover carrier in the X direction over a short period of time.

During coupling or after coupling of the first coupling element into the front slotted link, the second coupling element can be decoupled from the rear slotted link or leave it.

As a result of the provision of two slotted links and two coupling elements, it is possible for the rear slotted link to be shortened in terms of its path. In particular, an additional portion of the rear slotted link can be dispensed with, which portion controls a carrying of the cover carrier by the sliding member, that is to say, an X-locking between the sliding member and the cover carrier. Such a portion would substantially extend in a vertical direction and consequently requires structural space in the Z direction. In the closed position of the cover, this portion would generally protrude below the rail base of the guide rail in the Z direction and consequently reduce structural space of a passenger compartment of the vehicle. In addition, in the guide rail or the base thereof, corresponding indentations or recesses would have to be provided, for example, so that this additional portion can be displaced relative to the guide rail during the deployment of the cover.

With the arrangement according to the invention, the X-locking or carrying of the cover carrier by the sliding member is mainly transferred to the front slotted link so that the function of the deployment of the cover and the carrying of the cover is divided over two slotted links. Another advantage is that for the first coupling element no fully constructed slotted link path has to be provided in the cover carrier, but instead only in the region of the carrying in the X direction. This mainly means in this context that optionally, as mentioned above, both coupling elements can briefly contribute to carrying the cover carrier in the X direction.

According to an embodiment of the invention, in the closed position of the cover the front slotted link has a path in which a spacing between the front slotted link and the cover in the longitudinal direction of the vehicle initially remains the same toward the rear and subsequently changes. The carrying of the cover carrier can thereby be controlled by the sliding member. In this instance, a particularly low-friction coupling and carrying which is connected with the fewest possible forces is enabled via the first coupling element. The spacing remaining the same is intended in this instance to be understood to mean that the spacing does not change at all, or only to a very small degree, for example, at a small angle with respect to the longitudinal direction of the vehicle. For example, the spacing with respect to the cover can increase or decrease toward the rear.

According to another embodiment of the invention, the path of the front slotted link has with respect to the longitudinal direction of the vehicle toward the rear a front portion in which a spacing between the front slotted link and the cover initially remains the same, a central portion in which the spacing between the front slotted link and the cover increases and a rear portion which extends in a vertical direction. A vertical direction means in this context that the path extends substantially perpendicularly relative to the longitudinal extent of the guide rail, in particular a tangential plane of the longitudinal extent. This defines a path at a small angle, for example, of up to 20°, with respect to the Z direction. That is to say, the rear portion extends substantially transversely relative to the front portion.

According to another embodiment of the invention, in the ventilator position of the cover the first coupling element is located in the front portion of the front slotted link or during coupling in the front portion. The ventilator position refers to the state of the cover in which the cover is raised or deployed in the rear region thereof, before it is subsequently pushed away over the vehicle roof. The first coupling element is thus located in a ventilator position in the front portion of the front slotted link or during coupling therein and can consequently, when the sliding member is displaced further in the longitudinal direction of the vehicle, move toward the rear into the rear portion of the front slotted link and can control the carrying of the cover carrier by the sliding member. During coupling is intended to be understood to mean that the first coupling element is not yet located in the front portion or is currently being coupled in the front portion.

According to another embodiment of the invention, in the closed position of the cover the rear slotted link has with respect to the longitudinal direction of the vehicle toward the rear a path in which the spacing between the rear slotted link and the cover in the longitudinal vehicle direction initially remains the same toward the rear and subsequently changes. In this instance, the spacing remaining the same or changing is intended to be understood in a similar manner to the case above.

As a result of such a path of the rear slotted link, it is possible, when the sliding member is displaced starting from the closed position, for a lifting of the cover in the front region or at the front edge thereof to be controlled. In this instance, the change of the spacing ensures the corresponding displacement of the cover in a vertical direction.

According to another embodiment of the invention, the path of the rear slotted link with respect to the longitudinal direction of the vehicle has toward the rear a first portion in which the spacing between the sliding member slotted link and the cover remains the same, and a second portion which is adjacent to the first portion and in which the spacing between the rear slotted link and the cover increases. The difference between the spacings in the first portion and in the second portion corresponds to a raising of the cover in the vertical direction.

According to another embodiment of the invention, in the closed position of the cover, the second coupling element is located in the first portion of the rear slotted link. It is thereby possible, when the sliding member is displaced in the longitudinal direction of the vehicle toward the rear, for the deployment of the cover in a vertical direction in the front region of the cover to be controlled.

According to another embodiment of the invention, the second coupling element is decoupled from the rear slotted link in the open position of the cover. As a result of the fact that the first coupling element controls the carrying in the X direction, the second coupling element can be decoupled from the rear slotted link. In this instance, the second coupling element can already decouple from the rear slotted link when the sliding member carries the cover carrier over the first coupling element. As a result, as mentioned in the introduction, it is possible for the rear slotted link to have a shortened path, in particular no path or only a very short path in a vertical direction.

According to another embodiment of the invention, the first coupling element is arranged after the cover carrier is carried by the sliding member close in the longitudinal direction of the vehicle behind a sliding element of the cover carrier. The cover carrier is guided in the front region thereof by means of the sliding element in a guiding slotted link and is supported on the vehicle roof. In this instance, the first coupling element after the cover carrier has been carried by the sliding member is arranged close to this sliding element. The term close in this context is intended to mean that the first coupling element is arranged between the sliding element of the cover carrier and the second coupling element. In particular, both coupling elements are arranged closer to the sliding element than to a rear end of the cover carrier.

As a result of the fact that the first coupling element is arranged close to the sliding element of the cover carrier, the first coupling element, when the sliding member is displaced and the cover carrier is pushed over the vehicle roof in a Z direction, carries out hardly any movement. The slotted link path for carrying the cover carrier using the sliding member S of the front slotted link can thereby also be constructed to be very short, in particular in the Z direction.

Other embodiments of the invention are disclosed in the dependent claims and in the following detailed description of an embodiment.

The embodiment is described below with reference to the appended Figures. Elements or features having the same construction or function are given the same reference numerals in all the Figures. Elements or features which have already been described using reference numerals are not necessarily provided with reference numerals in all the Figures.

DETAILED DESCRIPTION

Figure 1:
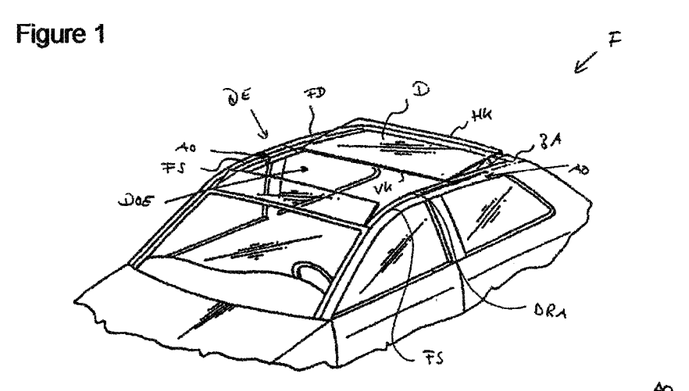
FIG. 1 is a schematic, perspective view of a vehicle.

FIG. 1 is a schematic, perspective view of a vehicle F having a vehicle roof FD. The vehicle roof FD has a securing portion BA which is secured to the vehicle and which is constructed as a roof shell. The securing portion BA which is secured to the vehicle is provided with a roof opening DOE which is selectively closed or at least partially releasable by means of an adjustable, movable roof element DE.

The roof opening DOE is delimited by a roof frame portion DRA which is constructed on the vehicle roof FD. The roof frame portion DRA has arrangements AO which are preferably arranged at both sides with guide rails FS. The roof element DE is supported in the region of the securing portion BA so as to be able to be displaced in relative terms with respect to the guide rails FS.

The movable roof element DE has a cover D and is displaceably supported by means of a cover carrier and arrangements AO in the guide rails FS. The cover D is preferably constructed as a glass cover.

The cover D is intended to be displaced from a closed position in order to close the roof opening DOE into an open position in order to thus release the roof opening DOE of the vehicle roof FD. To this end, the arrangements AO have the deployment means. For opening, the cover D is pushed over a rear portion of the vehicle roof FD. To this end, it is necessary for the cover D first to be raised since, in the closed position, it terminates flush with the upper side of the vehicle roof FD. During a typical movement sequence, a rear edge HK of the cover D is first deployed. This intermediate position is also referred to as a ventilator position. During the subsequent opening movement, the cover D is subsequently displaced in the longitudinal direction of the vehicle toward the rear over the vehicle roof FD into the open position. In this instance, the cover D is additionally also completely raised in the region of a front edge VK opposite the rear edge HK.

This typical movement sequence is carried out using the arrangement AO for a vehicle roof FD which are described in greater detail with reference to the following FIGS. 2 to 9. In this instance, in FIGS. 2 to 9, only one arrangement AO is illustrated at one side of the associated mechanism. However, all the components are arranged in a mirror-symmetrical manner with respect to a longitudinal center plane of the vehicle F at both sides of the roof opening DOE. The arrangement AO can also be referred to as a deployment device.

It should be noted that FIGS. 2 to 9 illustrate only the cover carrier DT which is securely coupled mechanically to the cover D. Consequently, the cover D is directly coupled by means of the deployment means and can be moved. A displacement of the cover D is accordingly synonymous with a displacement of the cover carrier DT.

FIGS. 2 to 9 further illustrate a coordinate system which indicates the directions Z and X. The X direction may in this instance also be referred to as the longitudinal direction of the vehicle or the horizontal direction. The Z direction may also be referred to as the vertical direction.

Figure 2:
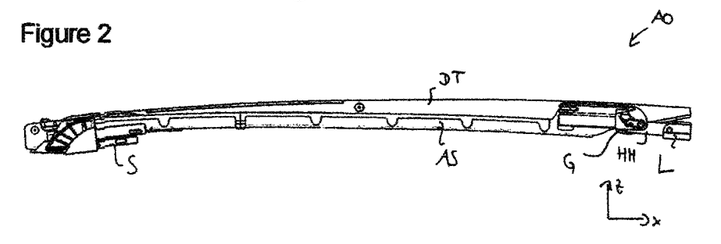
FIG. 2 is a schematic side view of an arrangement with a cover for a vehicle roof of the vehicle.

FIG. 2 is a schematic side view of an arrangement AO. The arrangement AO comprises a sliding member S which can be displaced toward the rear in a longitudinal direction of the vehicle by means of a drive in a guide rail FS (not illustrated). Furthermore, the arrangement AO comprises a deployment rod AS, a stationary fixed bearing L and a rear deployment lever HH. The rear deployment lever HH is pivotably connected to a slider G which is displaceably guided on the cover carrier DT. Consequently, the rear deployment lever HH is pivotably coupled to the cover D. In FIG. 2, the closed position of the cover D is illustrated.

If, starting from this closed position of the cover D, the sliding member S is displaced backward in the longitudinal direction of the vehicle, the deployment rod AS is also initially displaced backward parallel with the longitudinal direction of the vehicle since the deployment rod AS is mechanically coupled to the sliding member S. In this instance, the rear deployment lever HH is pivoted with respect to the bearing L so that the cover carrier DT or the cover D is deployed in the region of the rear edge HK or raised in the Z direction. In this state, the cover D is in the ventilator position. If the sliding member S is displaced further toward the rear, the sliding member S is decoupled from the deployment rod AS, wherein, at the same time, the front end of the deployment rod AS is secured by means of a locking mechanism (not described in greater detail) in a stationary fixed manner with respect to the guide rail FS. This means that the rear deployment lever HH is also locked in a stationary fixed manner with respect to the guide rail FS in the deployed position. In the event of a further displacement of the sliding member S after the locking of the deployment rod AS, the sliding member carries the cover carrier DT in a front region in the X direction, wherein the cover D is completely raised in the vertical direction in the front region. In this instance, the sliding member S pushes the cover carrier DT and consequently the cover D over the vehicle roof D into the open position. As described, to this end the rear deployment lever HH is displaceably coupled to the cover carrier DT via the slider G so that the cover D can be displaced in relative terms with respect to the locked, rear deployment lever HH.

Figure 3:
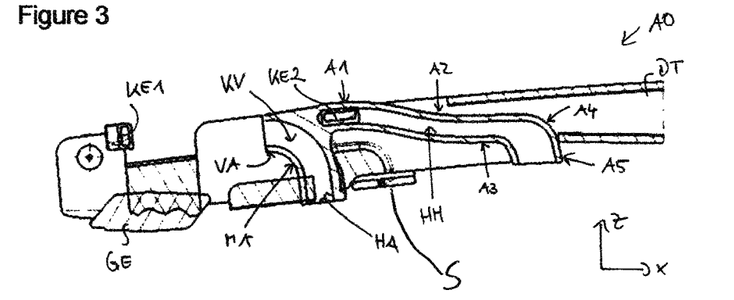
FIG. 3 is an enlarged, partially sectioned side view of the arrangement in a closed position.
Figure 4:
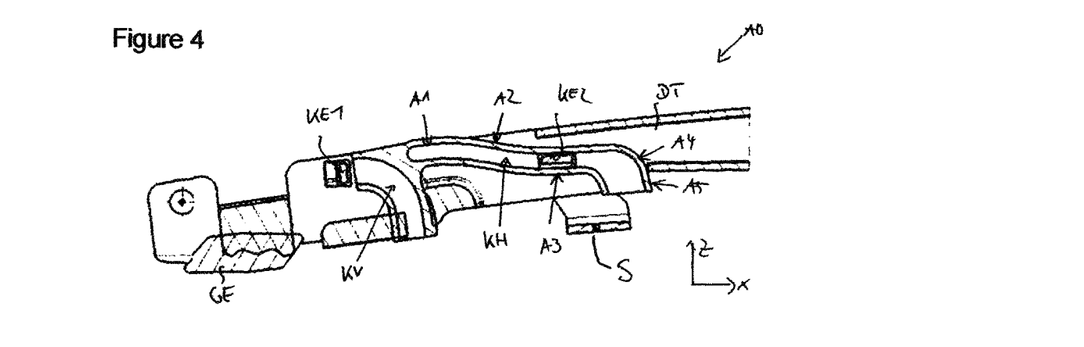
FIG. 4 is an enlarged, partially sectioned side view of the arrangement in a ventilator position.
Figure 5:
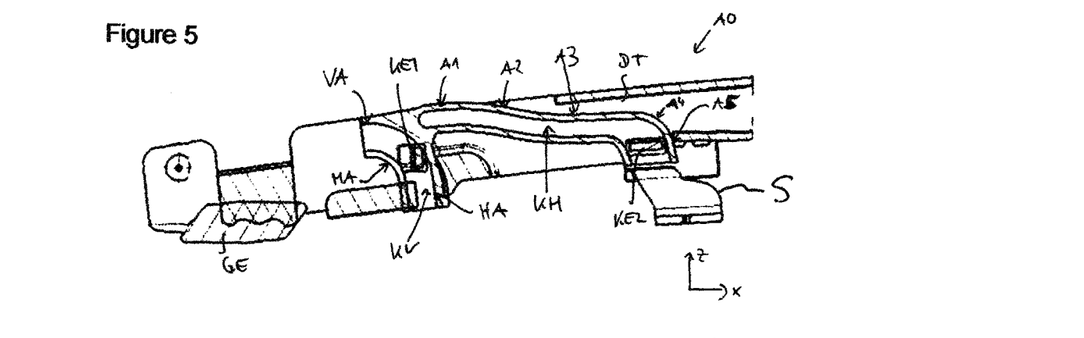
FIG. 5 is an enlarged, partially sectioned side view of the arrangement with a partially deployed front edge of the cover.
Figure 6:
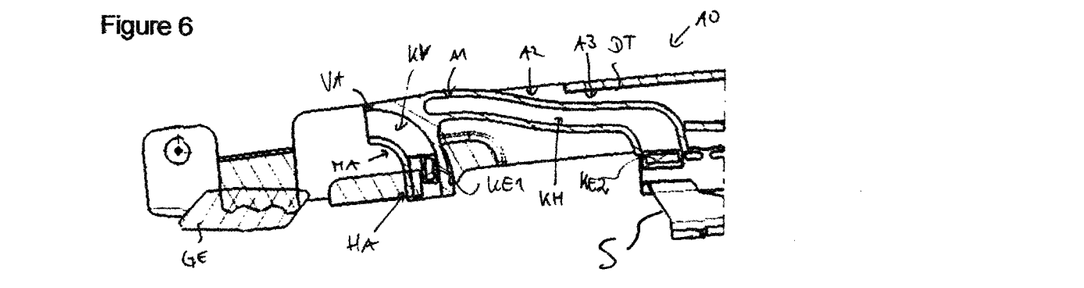
FIG. 6 is an enlarged, partially sectioned side view of the arrangement with a deployed front edge of the cover.

In the following FIGS. 3 to 6, the deployment means of the arrangement AO in a front region of the cover carrier DT are discussed in detail. FIG. 3 shows in this instance the arrangement AO in the closed position of the cover, FIG. 4 shows the arrangement AO in the ventilator position of the cover D, FIG. 5 shows the arrangement AO with a partially deployed front edge VK of the cover D and FIG. 6 shows the arrangement AO with a deployed front edge VK of the cover D. FIGS. 3 to 6 are schematic, partially sectioned side views of the arrangement AO. For reasons of clarity, the deployment rod AS is not illustrated. In addition, the sliding member S is illustrated only partially or not at all.

The cover carrier DT has a front slotted link KV and a rear slotted link KH which is arranged in the longitudinal direction of the vehicle behind the front slotted link KV. The cover carrier DT has in the front region thereof a front sliding element GE by means of which it is supported in relative terms with respect to the guide rail FS (not illustrated) so as to be able to be displaced in a manner not described in greater detail inside a slotted link which is stationary fixed to the vehicle (not illustrated). The sliding member S which is substantially not illustrated has two coupling elements, that is to say, a first coupling element KE1 and a second coupling element KE2.

The front slotted link KV has, with respect to the longitudinal direction of the vehicle toward the rear in the closed position of the cover, a path having a front portion VA in which a spacing between the front slotted link KV and the cover D in the longitudinal direction of the vehicle toward the rear remains the same. Furthermore, the path of the front slotted link KV has a central portion MA in which the spacing between the front slotted link KV and the cover D increases. Finally, the front slotted link KV has a rear portion HA which extends substantially in a vertical direction. The term substantially vertical in this context is intended to mean that the front slotted link KV extends in the rear portion HA perpendicularly (vertically) with respect to a longitudinal extent of the guide rail FS in the X direction toward the rear. The path of the longitudinal extent guide rail FS may also be slightly curved so that the rear portion HA extends perpendicularly relative to a tangential plane of the longitudinal extent. It is thus conceivable for the rear portion HA to be inclined slightly with respect to the Z direction as shown in the embodiment.

The rear slotted link KH has in the closed position of the cover D toward the rear with respect to the longitudinal direction of the vehicle a path which is also subdivided into a plurality of portions. In a first portion A1, the spacing between the rear slotted link KH and the cover is the same. The first portion A1 is adjoined by a second portion in which the spacing between the rear slotted link KH and the cover D increases. The second portion A2 is adjoined by a third portion A3 in which the spacing between the rear slotted link KH and the cover D remains substantially the same. The third portion A3 is adjoined by a fourth portion A4 in which the portion between the cover and the rear slotted link KH increases further. The fourth portion A4 is adjoined by an optional fifth portion A5 in which the path of the rear slotted link KH extends substantially vertically (in a similar manner to above).

In the closed position of the cover D, the second coupling element KE2 of the sliding member S is located in the first portion A1 of the rear slotted link KH. The first coupling element KE1 of the sliding member S is not in engagement with the front slotted link KV. In this instance, the first coupling element KE1 is arranged in the embodiment in the longitudinal direction of the vehicle above the sliding element GE of the cover carrier DT.

If the sliding member S is now displaced toward the rear in the opening direction, that is to say, in the X direction, by means of the drive, the sliding member S first moves in relative terms with respect to the cover carrier DT. This is a result of the fact that the sliding member S is not locked to the cover carrier DT in the X direction. The cover carrier DT is guided by means of the second coupling element KE2 of the sliding member S only in the Z direction. When the sliding member S is displaced starting from the closed position of the cover D, the second coupling element KE2 moves into the second portion A2 and subsequently into the third portion A3 of the rear slotted link KH. In this instance, the cover D is raised or deployed in the region of the second coupling element KE2 in the Z direction. This region can further also be referred to as the front region of the cover D.

In this case, the lifting is carried out in accordance with the change of the spacing of the path of the rear slotted link KH. The first coupling element KE1 is guided in the direction of the front slotted link KV. This is shown in FIG. 4, which shows the cover D in the ventilator position.

As a result of the displacement of the sliding member S, the rear deployment lever HH has additionally been pivoted by means of the deployment rod AS so that the cover D is now located in the ventilator position (not illustrated).

If the sliding member S is now displaced further, the first coupling element KE1 is coupled into the front slotted link KV. As soon as the first coupling element KE1 reaches the central portion MA of the front slotted link KV, the sliding member S carries the cover carrier DT toward the rear in the longitudinal direction of the vehicle. This means that the cover carrier DT and the sliding member S practically no longer carry out any relative movement toward each other, but instead only a relative movement in the Z direction. Furthermore, the cover D is deployed in the region of the front edge VK. The deployment is carried out in that, as a result of the cover carrier DT being carried by means of the first coupling element KE1, the sliding element GE is guided away from the guide rail in a vertical direction in the slotted link which is not illustrated and which is secured to the vehicle. The second coupling element KE2 of the sliding member S is now located in the fourth portion A4 of the rear slotted link KH. This is shown in FIG. 5. In this instance, the rear slotted link KH may be constructed in such a manner that the second coupling element KE2 carries the cover carrier DT in a supporting manner with respect to the first coupling element KE1 or alternatively is no longer in engagement with the rear slotted link KH.

FIG. 6 shows another state of the arrangement AO in which the sliding member S has been displaced further backward in the longitudinal direction of the vehicle. In this instance, the first coupling element KE1 is guided completely in the rear portion HA of the front slotted link KV, wherein a relative movement between the cover carrier DT and the sliding member S is definitively locked in the X direction. Furthermore, the cover D is deployed in the region of the front edge VK. The second coupling element KE2 can now be decoupled from the rear slotted link KH via the fifth portion A5. Should the second coupling element KE2 still be in engagement with the rear slotted link KH, the rear slotted link KH may be constructed in such a manner that a contact between the second coupling element KE2 and the rear slotted link KH is released. For example, the rear slotted link KH expands in the X direction so that the second coupling element KE2 is no longer in touching engagement with the rear slotted link.

As a result of the provision of the two slotted links KH and KV, it is possible to control the raising of the cover D in the region of the front edge VK thereof and the carrying of the cover carrier DT by the sliding member S by means of two slotted links. In this case, the rear slotted link KH controls the lifting of the cover D in the front region, whilst the front slotted link KV controls the carrying of the cover D in the X direction by means of the sliding member S. It is thereby possible for the rear slotted link KH to be able to be shortened in a rear region, in particular in the region adjacent to the fourth portion A4 or fifth portion A5. In this instance, it is not absolutely necessary to provide a portion such as the fifth portion A5 which extends substantially vertically (see above).

Another advantage of the described arrangement AO is that the front slotted link KV does not require any fully constructed slotted link path. It is sufficient if, as described, the first coupling element KE1 engages in the front slotted link KV only when the cover carrier DT is intended to be carried by the sliding member S. There is consequently produced a transfer from the second coupling element KE2 in the direction toward a Z-guide of the cover carrier DT to the coupling element KE1, which brings about the carrying of the cover carrier DT in the X direction.

Figure 7:
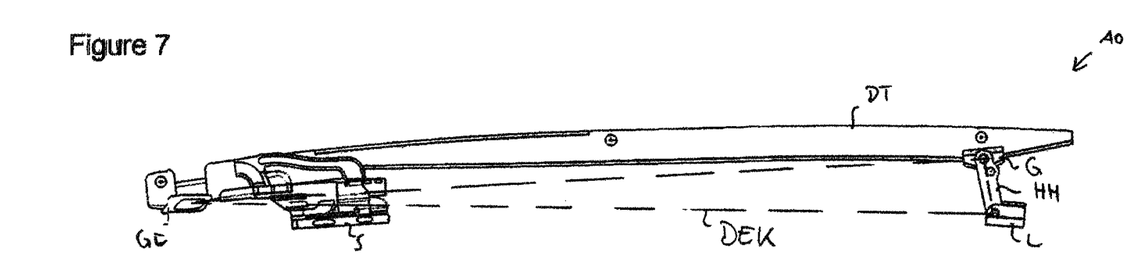
FIG. 7 is another schematic side view of the arrangement in the ventilator position and FIG. 8 is another schematic side view of the arrangement in a partially open position.
Figure 8:
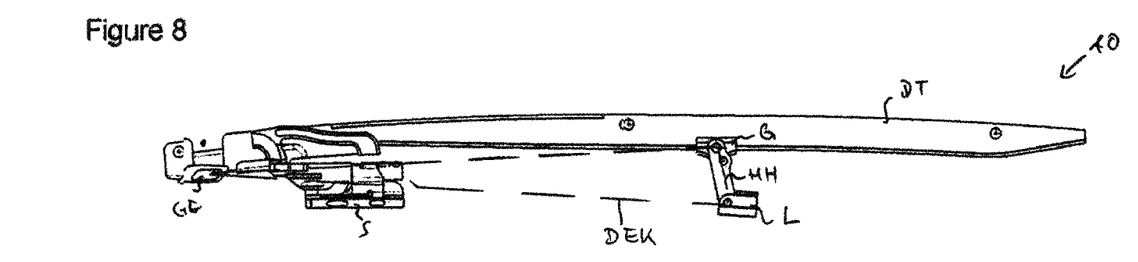
Figure 9:
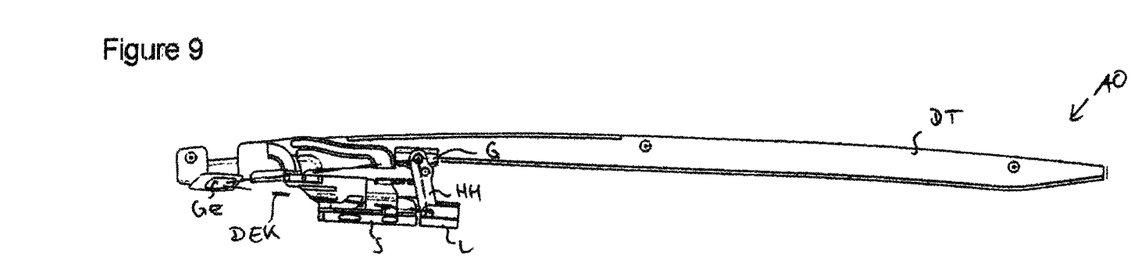
FIG. 9 is another schematic side view of the arrangement in the open position.

In FIGS. 7 to 9, the arrangement AO is illustrated in a similar manner to FIG. 2 as a general side view. In this instance, the state of the arrangement AO illustrated in FIG. 7 corresponds to the state illustrated in FIG. 6 in the front region of the cover carrier DT. As can be seen in particular in FIG. 7, the rear deployment lever HH is located in a deployed position. The deployment rod AS has been dispensed with for reasons of clarity.

If the sliding member S is displaced starting from the position shown in FIG. 7 further in the longitudinal direction of the vehicle toward the rear in the direction of the bearing L, the cover carrier DT is pushed with respect to the slider G in relative terms over the vehicle roof FD. When the sliding member S is displaced, the cover D in the front region still carries out a small movement in the Z direction. The further displacement of the sliding member S is illustrated in FIGS. 8 and 9, wherein the sliding member S has been moved completely to the rear in FIG. 9 and the cover D is consequently located in the open position thereof. The roof opening DOE is consequently released to the maximum extent.

As a result of the first coupling element KE1 being arranged in the coupled state in the front slotted link KV very close to the sliding element GE of the cover carrier DT, it carries out only a very small travel in the Z direction, starting from the state shown in FIG. 7. This is above all a result of the fact that the first coupling element KE1 is located close to the tip of a triangle DEK. The triangle DEK is formed by means of the sliding element GE, a pivot axis between the slider G and the rear deployment lever HH and a pivot axis between the rear deployment lever HH and the bearing L. This triangle DEK is illustrated with broken lines in FIGS. 7 to 9. The further the coupling element (in the embodiment the first coupling element KE1) which controls the carrying of the cover D in the X direction were to be removed during the carrying from the sliding element GE, the greater would be the travel in the Z direction when the roof opening DOE is released. In order to compensate for this travel, as described, the rear slotted link KH would have to be constructed to be significantly longer in the vertical direction.

The coupling elements KE1 and KE2 are constructed as sliding elements. All the components and elements which are illustrated can be modified and/or varied in terms of their explicit shaping, wherein the basic mechanical and kinematic operating principle of the arrangement AO as explained here is intended to be retained.

The invention claimed is:

1. An arrangement having a cover for a vehicle roof which, starting from a closed position for closing a roof opening, is raiseable in the rear region thereof for opening using deployment means and which cover is displaceable toward the rear over the vehicle roof into an open position, wherein the deployment means have
a sliding member which is displaceable in a guide rail along the longitudinal direction of the vehicle by means of a drive and which sliding member has a first coupling element and a second coupling element; and
a cover carrier, which is mechanically coupled to the cover and which has with respect to the longitudinal vehicle direction a front slotted link and a rear slotted link which is arranged behind the front slotted link;
wherein in the closed position of the cover, the second coupling element is in engagement with the rear slotted link in such a manner that, starting from the closed position of the cover when the sliding member is displaced toward the rear along the longitudinal direction of the vehicle by means of the rear slotted link, initially a movement of the sliding member relative to the cover is allowed and a deployment of the cover in a vertical direction can be controlled, and in that, in the event of further displacement, the first coupling element is coupled into the front slotted link and by means of the front slotted link a carrying of the cover carrier by the sliding member relative to the guide rail is controlled.

2. The arrangement according to claim 1, wherein in the closed position of the cover the front slotted link has a path in which a spacing between the front slotted link and the cover along the longitudinal direction of the vehicle initially remains the same toward the rear and subsequently changes.

3. The arrangement according to claim 2, wherein the path of the front slotted link has with respect to the longitudinal direction of the vehicle toward the rear a front portion in which a spacing between the front slotted link and the cover initially remains the same, a central portion in which the spacing between the front slotted link and the cover increases and a rear portion which extends in a vertical direction.

4. The arrangement according to claim 3, wherein in a ventilator position of the cover the first coupling element is located in the front portion of the front slotted link or the first coupling element is coupled in the front portion.

5. The arrangement according to claim 1, wherein in the closed position of the cover the rear slotted link has with respect to the longitudinal direction of the vehicle toward the rear a path in which the spacing between the rear slotted link and the cover along the longitudinal vehicle direction initially remains the same toward the rear and subsequently changes.

6. The arrangement according to claim 5, wherein the path of the rear slotted link with respect to the longitudinal direction of the vehicle has toward the rear a first portion in which the spacing between the rear slotted link and the cover remains the same, and a second portion which is adjacent to the first portion and in which the spacing between the rear slotted link and the cover increases.

7. The arrangement according to claim 5, wherein in the closed position of the cover, the second coupling element is located in the first portion of the rear slotted link.

8. The arrangement according to claim 1, wherein the second coupling element is decoupled from the rear slotted link in the open position of the cover.

9. The arrangement according to claim 1, wherein after the cover carrier has been carried a distance by the sliding member, the first coupling element is arranged behind a sliding element of the cover carrier with respect to the longitudinal direction of the vehicle.

10. The arrangement according to claim 1, wherein the coupling elements are constructed as sliding elements, which are rotary sliding elements.

\* \* \* \* \*